(12) United States Patent
Pyrcz et al.

(10) Patent No.: US 8,234,073 B2
(45) Date of Patent: Jul. 31, 2012

(54) SYSTEM AND METHOD FOR ESTIMATING GEOLOGICAL ARCHITECTURE OF A GEOLOGIC VOLUME

(75) Inventors: Michael J. Pyrcz, Humble, TX (US); Tim McHargue, Danville, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 364 days.

(21) Appl. No.: 12/604,971

(22) Filed: Oct. 23, 2009

(65) Prior Publication Data

US 2011/0098930 A1   Apr. 28, 2011

(51) Int. Cl.
   *G01V 1/40*   (2006.01)
(52) U.S. Cl. ............................................ 702/11; 703/10
(58) Field of Classification Search .......... 702/6, 11–13, 702/16, 18; 703/10; 367/40, 42
   See application file for complete search history.

(56) References Cited

U.S. PATENT DOCUMENTS

| | | | |
|---|---|---|---|
| 4,991,095 A | 2/1991 | Swanson | |
| 5,787,050 A | 7/1998 | Slevinsky | |
| 2010/0174517 A1* | 7/2010 | Slupphaug et al. | 703/10 |

FOREIGN PATENT DOCUMENTS

KR   10-0847772 B1   7/2008

OTHER PUBLICATIONS

U.S. Appl. No. 12/140,901, filed Jun. 17, 2009, Pyrcz et al.
U.S. Appl. No. 12/604,932, filed Oct. 23, 2009, Pyrcz et al.
Michael J. Pyrcz et al., in press, Numerical Modeling of Deepwater Channel Stacking Pattern from Outcrop and the Quantification of Reservoir Significance, SEPM special publication—Outcorps Revitalized.
U.S. Appl. No. 12/140,901, Jun. 17, 2008, Pyrcz et al.
U.S. Appl. No. 12/604,932, Oct. 23, 2009, Pyrcz et al.
Olena Babak et al., Accounting for Parameter Uncertainty in Reservoir Uncertainty Assessment: The Conditional Finite-Domain Approach, National Resources Research, Mar. 2009, pp. 7-17, vol. 18 No. 1, International Association for Mathematical Geology.
Sebastien Strebelle, Conditional Simulation of Complex Geological Structures Using Multiple-Point Statistics, Mathematical Geology, Jan. 2002, vol. 34 No. 1, International Association for Mathematical Geology.
Michael J. Pyrcz et al., in press, Numerical Modeling of Deepwater Channel Stacking Pattern from Outcrop and the Quantification of Reservoir Significance, SEPM special publication—Outcorps Revitalized, Apr. 2011.
Jeff B. Boisvert, Multiple-Point Statistics for Training Image Selection, Natural Resources Research, Dec. 2007, pp. 313-321, vol. 16, No. 4, International Association for Mathematical Geology.
Amisha Maharaja, Global Net-To-Gross Uncertainty Assessment at Reservoir Appraisal Stage, A Dissertation Submitted to the Department of Energy Resources Engineering and the Committee on Graduate Studies of Stanford University, Jun. 2007.

* cited by examiner

*Primary Examiner* — Manuel L Barbee
(74) *Attorney, Agent, or Firm* — Carlos L. Hanze

(57) ABSTRACT

The geological architecture of a geologic volume of interest is estimated through the generation and/or selection of one or more numerical analog models of the geologic volume of interest that represent characteristics of the geologic volume of interest as a function of position within the geologic volume of interest. The estimation of geological architecture of the geologic volume of interest may be implemented in reservoir exploration and/or development.

16 Claims, 9 Drawing Sheets

SYSTEM AND METHOD FOR ESTIMATING GEOLOGICAL ARCHITECTURE OF A GEOLOGIC VOLUME

FIELD OF THE INVENTION

The invention relates to the estimation of geological architecture of geologic volumes of interest through the generation and/or analysis of sets of numerical analog models.

BACKGROUND OF THE INVENTION

In the field of geological exploration, architectural uncertainty models are required for reservoir exploration and development. Reservoir architectural parameters include reservoir property distributions, trends, stacking patterns, and geometries of geologic bodies. These parameters often have a critical control on the reservoir response to exploitation schemes. Usually, local compliance data (e.g., well logs, core, seismic data, etc.) are not sufficient to reliably infer architectural parameters and their related uncertainty. Broad, naïve uncertainty models may be applied, but they are highly subjective, ignore important expert knowledge, and are of limited use in quantitative decision making.

SUMMARY OF THE INVENTION

One aspect of the invention relates to a computer implemented method of estimating geological architecture of a geologic volume of interest with a computing system that includes one or more electronic processors configured to execute one or more computer program modules. In one embodiment, the method comprises obtaining on one or more electronic storage media accessible to the computing system a plurality of numerical analogs for a geologic volume of interest, wherein a numerical analog for the geologic volume of interest represents a plurality of characteristics of the geologic volume of interest as a function of position within the geologic volume of interest; identifying interdependencies between the plurality of characteristics of the geologic volume of interest that are represented within the numerical analogs as a function of position within the geologic volume of interest; and assigning probabilities of correspondence between individual ones of the numerical analogs and the geologic volume of interest, wherein the probability of correspondence between a given one of the numerical analogs and the geologic volume of interest is assigned based on the distributions of the plurality of characteristics represented in the given numerical analog as a function of position within the geologic volume of interest and the determined interdependencies between the plurality of characteristics.

Another aspect of the invention relates to a computer implemented method of estimating geological architecture of a geologic volume of interest with a computing system that includes one or more electronic processors configured to execute one or more computer program modules. In one embodiment, the method comprises obtaining on one or more electronic storage media accessible to the computing system a plurality of numerical analogs for a geologic volume of interest, wherein a numerical analog for the geologic volume of interest represents a plurality of characteristics of the geologic volume of interest as a function of position within geologic volume of interest; obtaining on one or more electronic storage media accessible to the computing system interdependencies between the plurality of characteristics of the geologic volume of interest that are represented within the numerical analogs as a function of position within the geologic volume of interest; obtaining local compliance data that includes measurements taken at the geologic volume of interest related to one or more of the plurality of characteristics represented in the numerical analogs as a function of position in the geologic volume of interest; and determining probabilities of correspondence between individual ones of the numerical analogs and the geologic volume of interest, wherein the probability of correspondence between a given one of the numerical analogs and the geologic volume of interest is determined based on the distributions of the plurality of characteristics represented in the given numerical analog as a function of position within the geologic volume of interest, the local compliance data, and the determined interdependencies between the plurality of characteristics.

Another aspect of the invention relates to a computer implemented method of estimating geological architecture of a geologic volume of interest with a computing system that includes one or more electronic processors configured to execute one or more computer program modules. In one embodiment, the method comprises obtaining on one or more electronic storage media accessible to the computing system a plurality of numerical analogs for a geologic volume of interest, wherein a numerical analog for the geologic volume of interest represents a plurality of characteristics of the geologic volume of interest as a function of position within geologic volume of interest; obtaining on one or more electronic storage media accessible to the computing system interdependencies between the plurality of characteristics of the geologic volume of interest that are represented within the numerical analogs as a function of position within the geologic volume of interest; and determining one or more measurement parameters for the acquisition of local compliance data from the geologic volume of interest, wherein local compliance data that includes measurements taken at the geologic volume of interest related to one or more of the plurality of characteristics represented in the numerical analogs as a function of position in the geologic volume of interest, and wherein the one or more measurement parameters are based on the numerical analogs and the interdependencies between the plurality of characteristics of the geologic volume of interest that are represented within the numerical analogs.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

FIG. 3 illustrates a look-up table quantifying the interaction between various parameters of a geologic volume of interest, in accordance with one or more embodiments of the invention.

FIG. 5 illustrates how local compliance data can be used to discriminate between potential architectures described by different numerical analogs, in accordance with one or more embodiments of the invention.

DETAILED DESCRIPTION OF INVENTION

Figure 1:
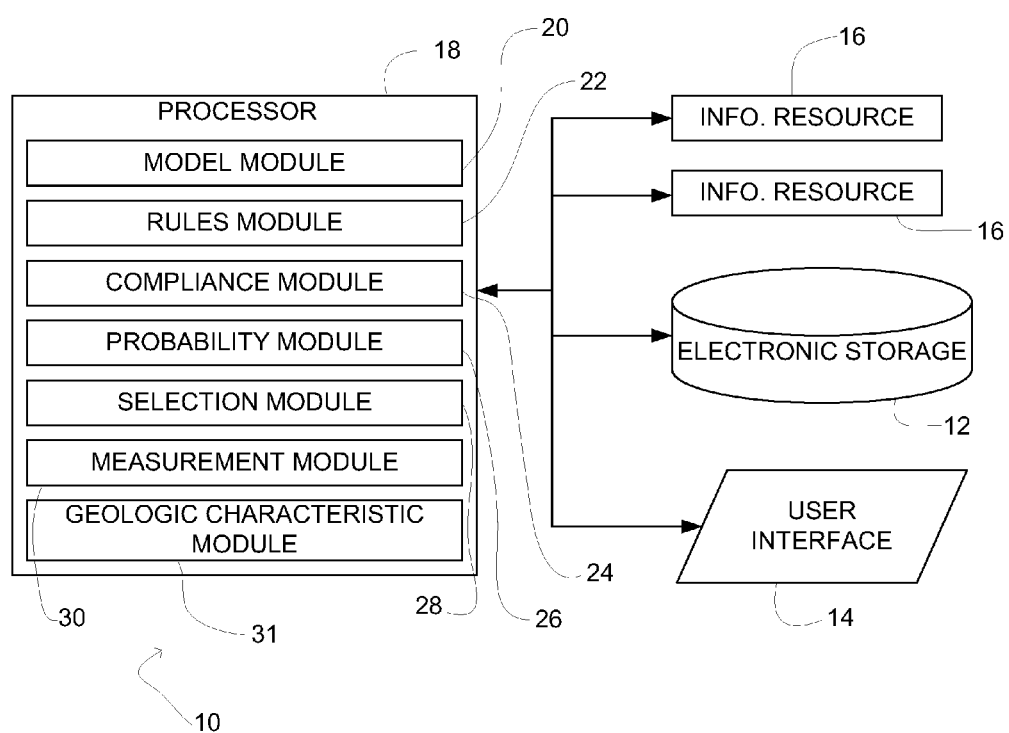
FIG. 1 illustrates a system configured to estimate geological architecture of a geologic volume of interest, in accordance with one or more embodiments of the invention.

FIG. 1 illustrates a system 10 configured to estimate geological architecture of a geologic volume of interest. The geological architecture of the geologic volume of interest is estimated through the generation and/or selection of one or more numerical analog models of the geologic volume of interest that represent characteristics of the geologic volume of interest as a function of position within the geologic volume of interest. The estimation of geological architecture of the geologic volume of interest may be implemented in reservoir exploration and/or development. In one embodiment, system 10 includes electronic storage 12, a user interface 14, one or more information resources 16, a processor 18, and/or other components.

In one embodiment, electronic storage 12 comprises electronic storage media that electronically stores information. The electronically storage media of electronic storage 12 may include one or both of system storage that is provided integrally (i.e., substantially non-removable) with system 10 and/or removable storage that is removably connectable to system 10 via, for example, a port (e.g., a USB port, a firewire port, etc.) or a drive (e.g., a disk drive, etc.). Electronic storage 12 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 12 may store software algorithms, information determined by processor 18, information received via user interface 14, information obtained from information resources 16, and/or other information that enables system 10 to function properly. Electronic storage 12 may be a separate component within system 10, or electronic storage 12 may be provided integrally with one or more other components of system 10 (e.g., processor 12) in a single device (or set of devices).

User interface 14 is configured to provide an interface between system 10 and one or more users through which the user(s) may provide information to and receive information from system 10. This enables data, results, and/or instructions and any other communicable items, collectively referred to as "information," to be communicated between the user(s) and one or more of electronic storage 12, information resources 16, and/or processor 18. Examples of interface devices suitable for inclusion in user interface 14 include a keypad, buttons, switches, a keyboard, knobs, levers, a display screen, a touch screen, speakers, a microphone, an indicator light, an audible alarm, and a printer.

It is to be understood that other communication techniques, either hard-wired or wireless, are also contemplated by the present invention as user interface 14. For example, the present invention contemplates that user interface 14 may be integrated with a removable storage interface provided by electronic storage 12. In this example, information may be loaded into system 10 from removable storage (e.g., a smart card, a flash drive, a removable disk, etc.) that enables the user(s) to customize the implementation of system 10. Other exemplary input devices and techniques adapted for use with system 10 as user interface 14 include, but are not limited to, an RS-232 port, RF link, an IR link, modem (telephone, cable or other). In one embodiment, user interface 14 may be provided on a computing platform in operative communication with a server performing some or all of the functionality attributed herein to system 10. In short, any technique for communicating information with system 10 is contemplated by the present invention as user interface 14.

The information resources 16 include one or more sources of information related to the geologic volume of interest and/or the process of estimating the geological architecture of geologic volume of interest. By way of non-limiting example, one of server 16 may include a set of previously determined rules related to the distributions of the characteristics of the geologic volume of interest. As is discussed further below, these rules may include one or more of relationships between one or more specific geological characteristics and one or more environmental parameters, interdependencies between a plurality of geological characteristics, constraints on one or more geological characteristics, and/or other rules related to the distributions of the characteristics of the geologic volume of interest. The rules may include rules that are generic to all (or substantially all) modeled geologic volumes, and/or rules that are specific to individual types of classes of reservoirs, depositional settings, geological areas, and/or other groups or sets of geologic volumes. The rules may include rules that are entered and/or modified by one or more users (e.g., via user interface 14), and/or rules that are automatically determined (e.g., by processor 18, or some other processor, as discussed below).

As another non-limiting example of information resources 16, one of information resources 16 may include a dataset including local compliance data for one or more geological volumes. As used herein, "local compliance data" refers to measurements taken at a geologic volume of one or more characteristics of the geologic volume. For instance, "local compliance data" may include measurements taken from equipment positioned within one or more wells drilled at or near a geologic volume, seismic data (or information derived therefrom) acquired at the surface at or near a geologic volume, and/or other measurements of one or more characteristics of a geologic volume.

Processor 18 is configured to provide information processing capabilities in system 10. As such, processor 18 may include one or more of a digital processor, an analog processor, a digital circuit designed to process information, an analog circuit designed to process information, a state machine, and/or other mechanisms for electronically processing information. Although processor 18 is shown in FIG. 1 as a single entity, this is for illustrative purposes only. In some implementations, processor 18 may include a plurality of processing units. These processing units may be physically located within the same device, or processor 18 may represent processing functionality of a plurality of devices operating in coordination.

As is shown in FIG. 1, processor 18 may be configured to execute one or more computer program modules. The one or more computer program modules may include one or more of a model module 20, a rules module 22, a compliance module 24, a probability module 26, a selection module 28, a measurement module 30, and/or other modules. Processor 18 may be configured to execute modules 20, 22, 24, 26, 28, and/or 30 by software; hardware; firmware; some combination of software, hardware, and/or firmware; and/or other mechanisms for configuring processing capabilities on processor 18.

It should be appreciated that although modules 20, 22, 24, 26, 28, and 30 are illustrated in FIG. 1 as being co-located within a single processing unit, in implementations in which processor 18 includes multiple processing units, one or more of modules 20, 22, 24, 26, 28, and/or 30 may be located remotely from the other modules. The description of the functionality provided by the different modules 20, 22, 24, 26, 28, and/or 30 described below is for illustrative purposes, and is not intended to be limiting, as any of modules 20, 22, 24, 26, 28, and/or 30 may provide more or less functionality than is described. For example, one or more of modules 20, 22, 24, 26, 28, and/or 30 may be eliminated, and some or all of its functionality may be provided by other ones of modules 20, 22, 24, 26, 28, and/or 30. As another example, processor 18 may be configured to execute one or more additional modules that may perform some or all of the functionality attributed below to one of modules 20, 22, 24, 26, 28, and/or 30.

The model module 20 is configured to obtain a plurality of numerical analogs for a geologic volume of interest. The obtained plurality of numerical analogs may be stored by model module 20 to electronic storage 12. Each of the obtained numerical analogs represents a possible geological architecture of the geologic volume of interest. The one or more geologic characteristics that are represented by the numerical analogs as a function of position may include one or more of porosity, permeability, facies or facies proportions, architectural element type, geometry, grain size, energy or velocity at time of deposition, deposition rate, distance from source, position relative to axis and margin of flow, position relative to base and top of flow, flow direction, flow concentration, full grain size distribution, flow volume, external to basin influences eustacy/water depth, sediment supply, tectonics/compaction parameters and/or other geologic characteristics.

The representation of one or more of these geologic characteristics by a numerical analog defines one or more geologic features of the corresponding geologic volume of interest that are a function of the represented geologic characteristics. For instance, the numerical analog may define one or more of channel sinuosity, sinuosity of other architectural elements, avulsion type, avulsion frequency or rate, aggradation rate or frequency, distribution of channel (or other architectural elements), spacing distribution of channel orientations, distribution of the characteristics described in the numerical analog, compensation index, lacunarity, connectivity/tortuosity, time series analysis on the sequence of any of the features, levee height and width, splay frequency, lateral accretion rate, or retrogradation/progradation rate, and/or other geologic features.

In one embodiment, model module 20 is configured to obtain at least some of the plurality of numerical analogs for the geologic volume of interest from one of information resources 16. In one embodiment, model module 20 is configured to actually generate at least some of the numerical analogs. The numerical analogs may be generated by model module 20 as described in U.S. patent application Ser. No. 12/140,901, which is hereby incorporated by reference into this disclosure in its entirety. The generation of the numerical analogs may, in some cases, take into account local compliance data. For example, U.S. patent application Ser. No. 12/604,932, which is hereby incorporated by reference into this disclosure in its entirety, discloses a system and technique for generating a plurality of numerical analogs of a geologic volume of interest based in part on local compliance data. Technologies such as the ones described in the applications incorporated by reference above may enable model module 20 to obtain a relatively large set of numerical analogs to be processed further in the estimation of geological architecture. By way of non-limiting example, the number of numerical analogs may be tens to thousands.

The rules module 22 is configured to obtain interdependencies between the plurality of characteristics of the geologic volume of interest that are represented by the numerical analogs. These rules provide quantification of interactions between the geologic characteristics that can be used to constrain architectural uncertainty, and/or to facilitate prediction of geological architecture. By way of non-limiting example, the rules obtained by rules module 22 may quantify the interaction between one or more of aggradation rate and concentration of net reservoir volume (e.g., lower rates of aggradation tend to result in higher concentrations of net reservoir volume), avulsion rate and connectivity (e.g., higher avulsion rates tend to result in lower connectivity), lateral stepping and preservation of potential channel axis within channel elements (e.g., in deepwater channels, lateral stepping tends to reduce the preservation of potential channel axis within channel elements), and/or other interactions. The rules module 22 may store the obtained rules to electronic storage 12 for future access and/or processing.

Figure 2:
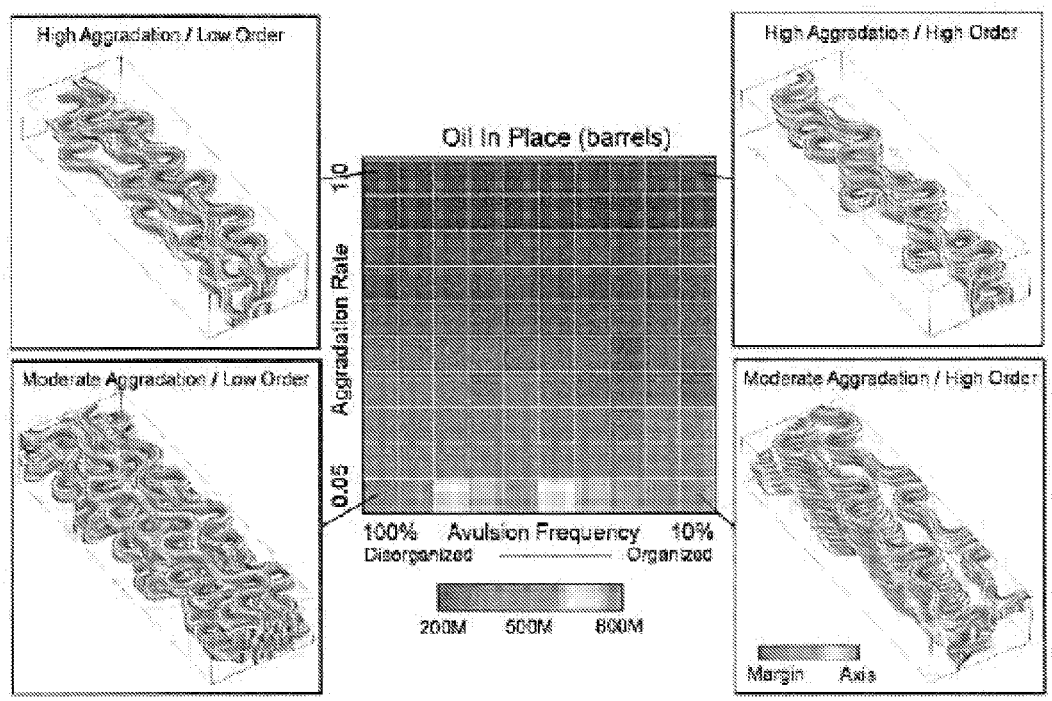
FIG. 2 illustrates a response surface quantifying the interaction between various parameters of a geologic volume of interest, according to one or more embodiments of the invention.
Figure 3:
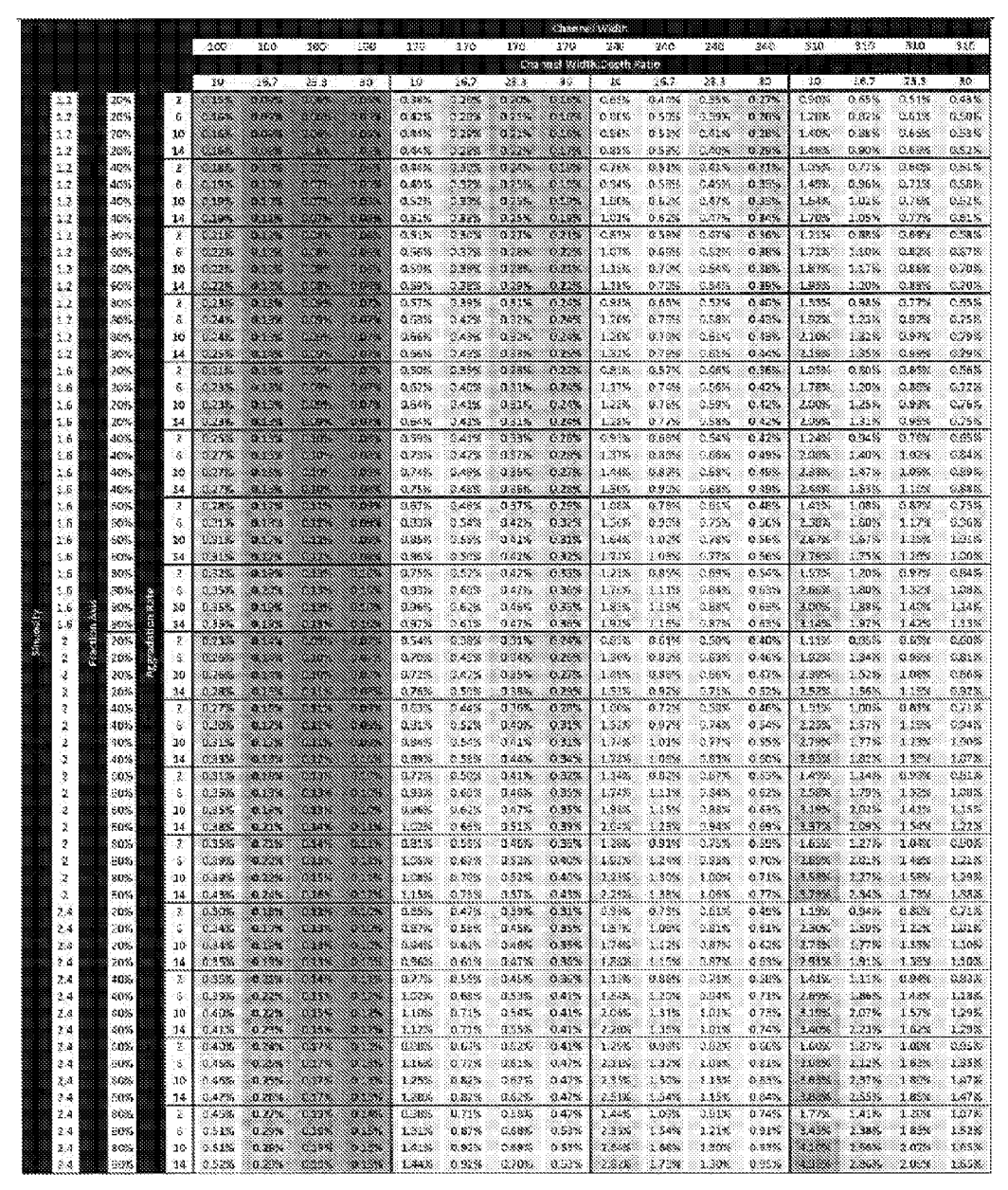

The rules obtained by rules module 22 may include one or more of general rules, sensitivities, response surfaces, look up tables, multivariate regression modules, and/or other rules that quantify interactions between geologic characteristics. By way of illustration, FIG. 2 shows a response surface quantifying the interaction between net reservoir volume, aggradation rate, and frequency of avulsion within an architectural element (e.g., within a channel). As another example, FIG. 3 shows a look-up table quantifying the interaction between net reservoir volume and geologic characteristics and/or features for disorganized channel settings.

Referring back to FIG. 1, in one embodiment, rules module 22 is configured to obtain one or more rules for the geologic volume of interest that have been predetermined. Such rules may be obtained, for example, from one of information resources 16. The predetermined rule(s) may be specific to a type of depositional setting and/or reservoir type that corresponds to the geologic volume of interest, or may be more generic. The predetermined rule(s) may have been generated by another system based on previous analysis of local compliance data and/or numerical analogs representing the geologic volume of interest. The rules module 22 may enable one or more users to modify or configure the predetermined rule(s) (e.g., via user interface 14) prior to implementation.

In one embodiment, rules module 22 is configured to generate one or more of the rules based on analysis of the numerical analogs of the geologic volume of interest that have been obtained by model module 20. The rules may be generated by observing cumulative relationships between the characteristics described by the numerical analogs over the totality of the numerical analogs. For example, a relatively high level of one characteristic may commonly, within the obtained numerical analogs, be found in conjunction with a relatively low level of another characteristic. This relationship may be quantified by rules module 22 in the form of a rule. It will be appreciated that this simplistic example, is not intended to be limiting, and more complex relationships between two or more characteristics and/or geologic features defined by such characteristics quantified by rules created through analysis of the numerical analogs for the geologic volume of interest fall within the scope of this disclosure.

The generation of the rules described above through analysis of the numerical analogs obtained for the geologic volume of interest (whether such analysis is actually performed by rules module 22, or the rules are obtained subsequently by rules module 22 from one of information resources 16) may provide various enhancements in the estimation of the geological architecture of the geologic volume of interest. For instance, the rules may quantify interdependencies between geologic characteristics that are specific to the geologic volume of interest and/or that appear distant or tenuous by traditional understandings of the interactions between geologic characteristics.

In one embodiment, rules module 22 presents the obtained rules to the user(s) (e.g., via user interface 14). This enables the user(s) to review the rules prior to implementation to examine in greater detail rules that seem to the user(s) to be the result of a statistical anomaly in the numerical analogs obtained by model module 20. Once the user(s) has reviewed an apparently anomalous rule, and/or the basis for the rule, rules module 22 may enable the user to reject the rule so that the rule will not be used in further processing, or to modify the rule.

The compliance module 24 is configured to obtain local compliance data for the geologic volume of interest. The compliance module 24 may obtain the local compliance data from one of information resources 16. The compliance module 24 may store the obtained local compliance data to electronic storage 12 for future access and/or processing.

The probability module 26 is configured to determine probabilities of correspondence between individual ones of the numerical analogs obtained by model module 20 and the geologic volume of interest. The probability of correspondence for a given numerical analog represents as a probability the likelihood that the given numerical analog accurately depicts the geological architecture of the geologic volume of interest. The probabilities of correspondence are determined by probability module 26 based on the rules obtained by rules module 22. As will be appreciated, numerical analogs representing geological architectures that exhibit the interdependencies between characteristics that are quantified by the rules obtained by rules module 22 are assigned a higher probability by probability module 26 than numerical analogs representing geological architectures that do not exhibit the interdependencies quantified by the rules.

Figure 4:
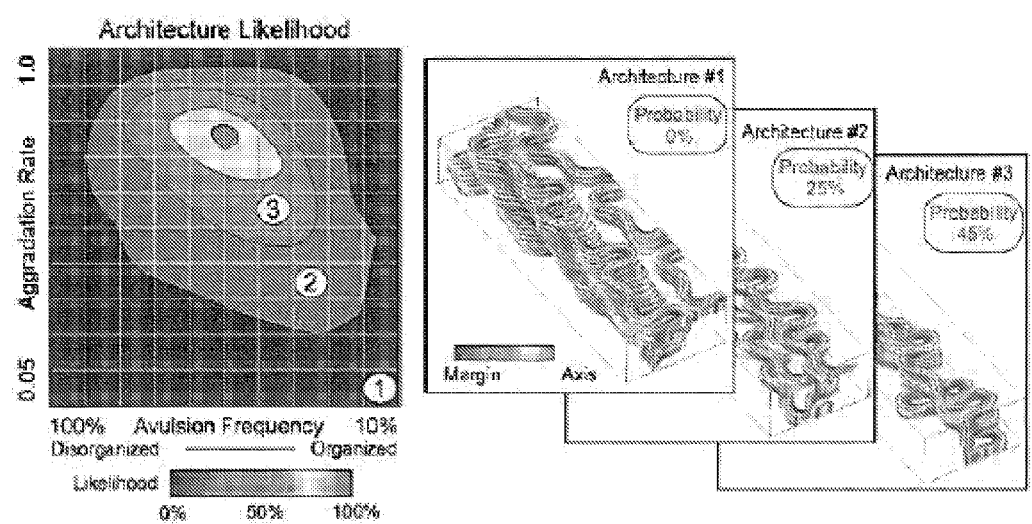
FIG. 4 illustrates a chart showing probability of correspondence solely as a function of various parameters of a geologic volume of interest, according to one or more embodiments of the invention.

By way of illustration, FIG. 4 illustrates a chart showing probability of correspondence solely as a function of aggradation rate and avulsion frequency. FIG. 4 further shows 3 exemplary architectures for a geologic volume of interest (as would be represented by 3 separate numerical analogs for the geologic volume of interest), and provides the probability of correspondence associated with these architectures based on the chart. In the embodiment illustrated in FIG. 4, the chart is a visual representation of a rule similar to the rules that would be obtained by rules module 22 shown in FIG. 1 and described above. It will be appreciated that determination of a probability of correspondence may, in some instances, be made based on a plurality of rules. In such instances, the probability represented in FIG. 4 for the illustrated architectures may be aggregated with other probabilities derived according to other rules quantifying interdependencies between the features represented by the numerical analogs being analyzed.

Referring back to FIG. 1, in one embodiment, in addition to implementing the rules obtained by rules module 22, probability module 26 also implements the local compliance data in determining the probabilities of correspondence. In this embodiment, the features represented in the numerical analogs are compared with the local compliance data. Numerical analogs for which the features represented have a relatively strong correlation to the local compliance data will tend to have higher probabilities of correspondence than numerical analogs for which the features represented have a relatively weak correlation to the local compliance data.

Figure 5:
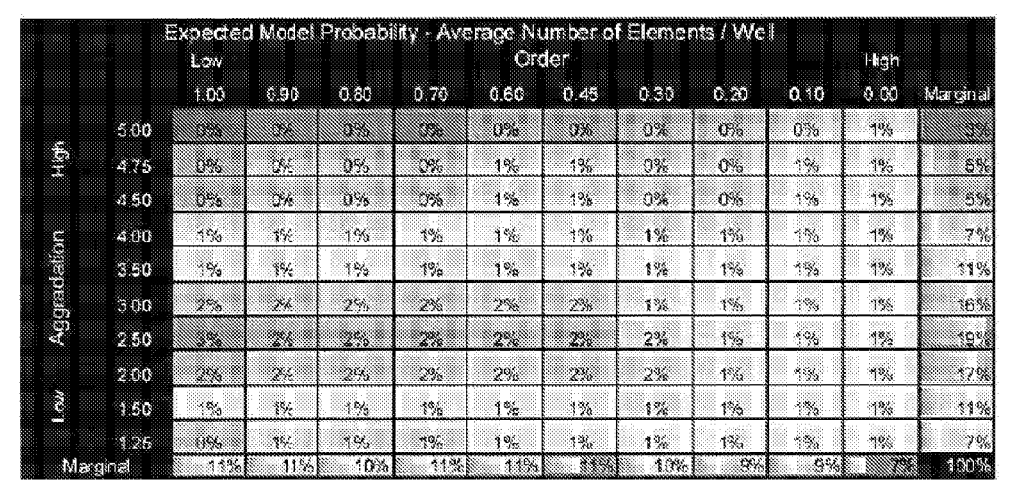

In order to use the local compliance data in this manner, probability module 26 may implement selection statistics that discriminate between potential architectures represented by numerical analogs based on correlation with local compliance data. For example, FIG. 5 shows a chart illustrating how local compliance data can be used to discriminate between potential architectures described by different numerical analogs. Specifically, in the chart shown in FIG. 5, the architectural parameters include rate of aggradation and degree of channel order, and the average number of elements per well is used to discriminate between the architectures. It will be appreciated that the description of features with respect to parameters and/or features of channels is not intended to be limiting. Applying the same principles to the parameters and/or features of other types of architectural elements (e.g., lobes, bars, etc.) within the geologic volume of interest falls within the scope of this disclosure.

Referring back to FIG. 1, in one embodiment, probability module 26 bases a determination of correlation between local compliance data associated with a well log and one of the numerical analogs by spatially bootstrapping to resample the local compliance data from the numerical analog and then comparing the local compliance data from the well log and the resampling performed in the numerical analog. In one embodiment, the local compliance data includes seismic data. In this embodiment, a determination of correlation between the local compliance data and the numerical analog is based on a comparison of a full 3d forward seismic transform of the local compliance data with the geological architecture defined by the numerical analog.

The selection module 28 is configured to select one or more of the numerical analogs for further processing. The selection module 28 selects one or more of the numerical analogs for further processing based on the probabilities of correspondence determined for the numerical analogs by probability module 26. In one embodiment, the selection module 28 selects a predetermined number of the numerical analogs that have the highest probabilities of correspondence. The predetermined number may be configurable (e.g., via user interface 14) by one or more users. In one embodiment, selection module 28 selects the predetermined number of numerical analogs for further processing stochastically, using the probabilities of correspondence to weight the stochastic selection. In one embodiment, selection module 28 compares the probabilities of correspondence with a predetermined threshold and selects the numerical analogs having probabilities of correspondence greater than the predetermined threshold for further processing. The predetermined threshold may be configurable (e.g., via user interface 14) by one or more users.

The measurement module 30 is configured to determine one or more measurement parameters for the acquisition of local compliance data from the geologic volume of interest. The one or more measurement parameters determined by measurement module 30 are designed to result in local compliance data that will enhance the accuracy of the estimation of geological architecture of the geologic volume of interest by system 10. For example, the one or more measurement parameters may be designed to result in local compliance data that will have enhanced utility in discriminating between a specific set of numerical analogs. The one or more measurement parameters may include one or more parameters of a well to be drilled for the purposes of obtaining compliance data, one or more parameters related to the locations and/or orientations of instrumentation used to collect local compliance data (e.g., seismic sources and/or detectors), and/or other parameters related to acquiring local compliance data at or near the geologic volume of interest.

The measurement module 30 is configured to determine the one or more measurement parameters based on the specific set of numerical analogs to be discriminated between, the rules obtained by rules module 22, and/or previously obtained local compliance data. By analyzing the set of numerical analogs to be discriminated between and the rules obtained by rules module 22, measurement module 30 is capable of identifying local compliance data that will have an enhanced impact in confirming or disproving correspondence between the geologic volume of interest and the individual numerical analogs. The measurement module 30 then determines measurement parameters for the acquisition of local compliance data that will tend to result in local compliance data that will confirm or disprove correspondence for an enhanced number of the numerical analogs.

In one embodiment, the measurement parameters for the acquisition of local compliance data determined by measurement module 30 will "maximize" the impact of the local compliance data in discriminating between the numerical analogs. However, it will be appreciated that in some embodiments, "maximization" of such impact is too costly (e.g., from a processing, time, and/or information storage standpoint) a calculation, and/or "maximization" may be defined differently (e.g., providing greatest certainty for one or more numerical analogs, impacting the probability of correspondence for the greatest number of numerical analogs, etc.). As such, embodiments in which enhancement of the impact of the local compliance data for discriminating between numerical analogs over an unguided acquisition of local compliance data does not reach actual "maximization" still fall within the scope of this disclosure.

Figure 6:
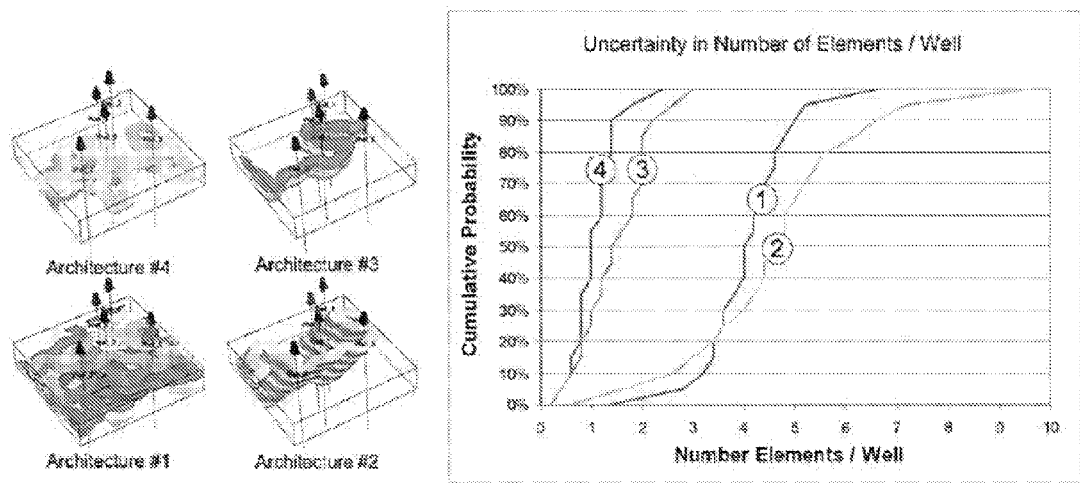
FIG. 6 illustrates the determination of measurement parameters, in accordance with one or more embodiments of the invention.

By way of illustration, FIG. 6 illustrates several potential geological architectures represented by numerical analogs. Five suggested wells through the geologic volume of interest are shown in these geological architectures that will provide for further discrimination between the architectures according to the chart also shown in FIG. 6. The parameters of the five suggested wells may be determined by a measurement module that is similar to or the same as measurement module 30 described above and shown in FIG. 1. In one embodiment, the determination of parameters by the measurement module may be guided by one or more users. For instance, in the example illustrated in FIG. 6, the one or more users may have set a maximum number of wells to be drilled for data acquisition (e.g., 5), and the measurement module may have then determined the measurement parameters of 5 wells that would facilitate discrimination between the potential geological architectures.

Returning to FIG. 1, the geologic characteristic module 31 is configured to determine one or more geologic characteristics of interest of the geologic volume of interest. The geologic characteristic module 31 is configured to determine the one or more geologic characteristics based on the numerical analogs obtained by model module 20 and/or selected by selection module 28. The geologic characteristics of interest generally include geological characteristics related to reservoirs of fossil-fuels located in the geologic volume of interest. For example, the geologic characteristics may include one or more of net to gross ratio, connectivity, architectural geometries, recovery, and/or other characteristics.

These geologic characteristics may be different than the geologic characteristics used by compliance module 24 and probability module 26 to determine probability of correlation between the numerical analogs and the geologic volume of interest. For example, one dimensional geologic characteristics may be implemented by compliance module 24 and probability module 26 to determine probability of correlation based on one dimensional well data. Such geologic characteristics may include, for example, one or more of amalgamation ratio, frequency distribution of elements and between elements, thickness distribution of elements and between elements, one dimensional lacunarity, semivariogram parameters, transition probabilities, and/or other characteristics. However, once the numerical analogs have been weighted and/or selected (e.g., by selection module 28), geologic characteristic module 31 spatially bootstraps using the numerical analogs of the geologic volume of interest to determine the three dimensional geologic characteristics.

In one embodiment, geologic characteristic module 31 determines the geologic characteristics of interest by analyzing the plurality of the numerical analogs. These may include all of the numerical analogs obtained by model module 20, or a group of numerical analogs that have been selected by selection module 28. By way of non-limiting example, geologic characteristic module 31 may scan each of the numerical analogs of the geologic volume of interest and record for each of the numerical analogs (i) a value for a geologic characteristic used by compliance module 24, probability module 26, and/or selection module 28 to weight and/or select the different numerical analogs (e.g., amalgamation ratio, frequency distribution of elements and between elements, thickness distribution of elements and between elements, one dimensional lacunarity, etc.), and (ii) a value of a geologic characteristic of interest (e.g., net to gross ratio, connectivity, architectural geometries, recovery, etc.) determined through spatial bootstrapping.

Upon making this scan for each of the models of the geologic volume of interest, geologic characteristic module 31 may plot (or mathematically model, or otherwise correlate) the determined value of the geologic characteristic of interest versus one or more of the directly measured geologic characteristics used by compliance module 24, probability module 26, and/or selection module 28. Once this has been performed for each of the numerical analogs of the geologic volume of interest, this plot (or correlation) may be implemented by geologic characteristic module 31 to plot (or otherwise express) the conditional probabilities of the characteristic of interest versus the one or more geologic characteristics observable in the local data (e.g., the one dimensional characteristic(s) from well data). As such, the geologic characteristic module 31 is able to formulate an architectural uncertainty model based on the local compliance data and the numerical analogs obtained by model module 20.

Figure 7:
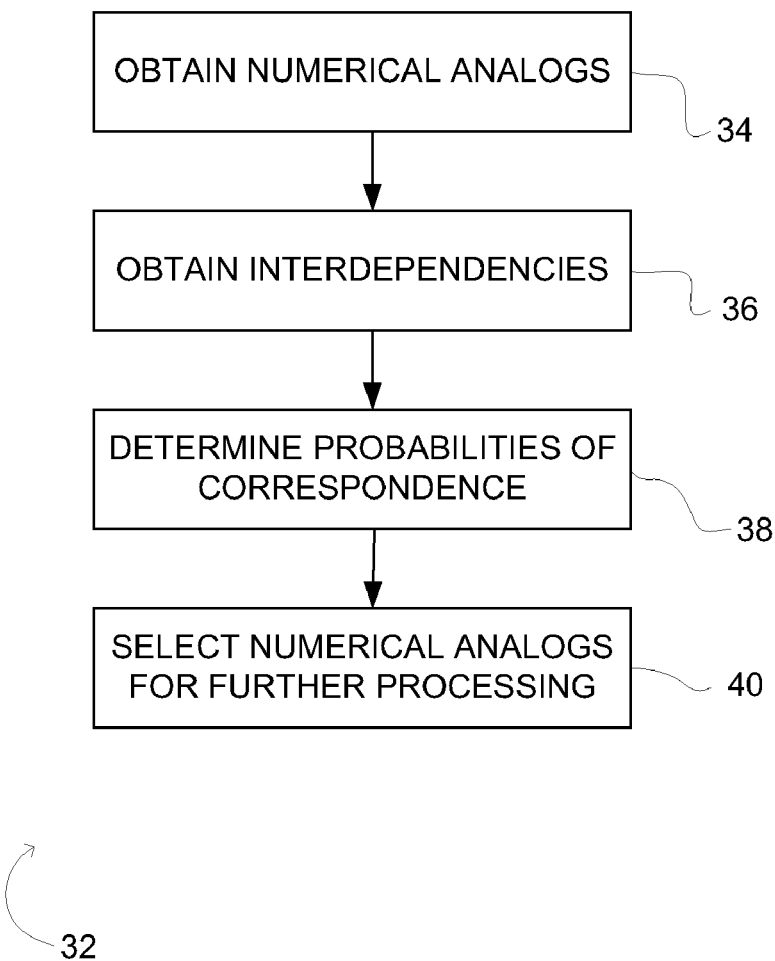
FIG. 7 illustrates a method of estimating geological architecture of a geologic volume of interest, according to one or more embodiments of the invention.

FIG. 7 illustrates a method 32 of estimating geological architecture of a geologic volume of interest. The operations of method 32 presented below are intended to be illustrative. In some embodiments, method 32 may be accomplished with one or more additional operations not described, and/or without one or more of the operations discussed. Additionally, the order in which the operations of method 32 are illustrated in FIG. 7 and described below is not intended to be limiting.

In some embodiments, method 32 may be implemented in a computing system comprising one or more processors (e.g., a digital processor, an analog processor, a digital circuit designed to process information, an analog circuit designed to process information, a state machine, and/or other mechanisms for electronically processing information). The one or more processors may include one or more devices executing some or all of the operations of method 32 in response to instructions stored electronically on an electronic storage medium. The one or more processors may include one or more devices configured through hardware, firmware, and/or software to be specifically designed for execution of one or more of the operations of method 32.

At an operation 34, numerical analogs for the geologic volume of interest are obtained. Obtaining the numerical analogs may include generating one or more numerical analogs and/or obtaining one or more previously stored analogs. In one embodiment, operation 34 is performed by a model module that is the same as or similar to model module 20 (shown in FIG. 1 and described above).

At an operation 36, interdependencies between the characteristics described in the numerical analogs are obtained. Obtaining the interdependencies may include analyzing the numerical analogs to determine the interdependencies and/or obtaining previously stored interdependencies. The interdependencies may include interdependencies that are generated, modified, and/or configured by one or more users. In one embodiment, the interdependencies may be quantified by one or more rules. In this embodiment, obtaining the interdependencies may include obtaining the rules that quantify the interdependencies. In one embodiment, operation 36 is performed by a rules module that is the same as or similar to rules module 22 (shown in FIG. 1 and described above).

At an operation 38, probabilities of correspondence are determined and/or assigned to the individual numerical analogs. The probability of correspondence assigned to a given numerical analog expresses a probability that the actual geological architecture of the geologic volume of interest corresponds to the geological architecture described by the given numerical analog. The probabilities of correspondence of the numerical analogs are determined by applying the interdependencies obtained at operation 36 to the numerical analogs. In one embodiment, operation 38 is performed by a probability module that is the same as or similar to probability module 26 (shown in FIG. 1 and described above).

At an operation 40, a first set of the numerical analogs are accepted for further analysis and/or processing and a second set of numerical analogs are rejected for further analysis or processing. The numerical analogs are divided at operation 40 into the first set and the second set based on the probabilities of correspondence determined at operation 38. In one embodiment, operation 40 is performed by a selection module that is the same as or similar to selection module 28 (shown in FIG. 1 and described above).

Figure 8:
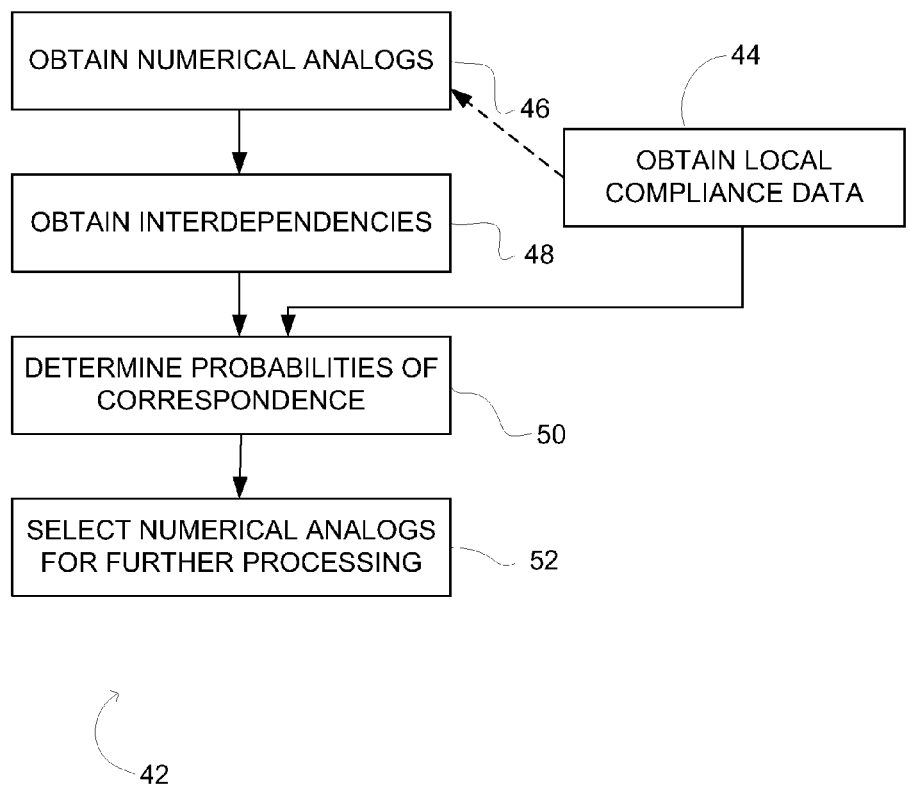
FIG. 8 illustrates a method of estimating geological architecture of a geologic volume of interest, according to one or more embodiments of the invention.

FIG. 8 illustrates a method 42 of estimating geological architecture of a geologic volume of interest. The operations of method 42 presented below are intended to be illustrative. In some embodiments, method 42 may be accomplished with one or more additional operations not described, and/or without one or more of the operations discussed. Additionally, the order in which the operations of method 42 are illustrated in FIG. 8 and described below is not intended to be limiting.

In some embodiments, method 42 may be implemented in a computing system comprising one or more processors (e.g., a digital processor, an analog processor, a digital circuit designed to process information, an analog circuit designed to process information, a state machine, and/or other mechanisms for electronically processing information). The one or more processors may include one or more devices executing some or all of the operations of method 42 in response to instructions stored electronically on an electronic storage medium. The one or more processors may include one or more devices configured through hardware, firmware, and/or software to be specifically designed for execution of one or more of the operations of method 42.

At an operation 44 local compliance data related to the characteristics of the geologic volume of interest is obtained. The obtained local compliance data may be stored to electronic storage. In one embodiment, operation 44 is performed by a compliance module that is the same as or similar to compliance module 24 (shown in FIG. 1 and described above).

At an operation 46, numerical analogs for the geologic volume of interest are obtained. Obtaining the numerical analogs may include generating one or more numerical analogs and/or obtaining one or more previously stored analogs. At least some of the characteristics represented in the obtained numerical analogs are related to the local compliance data obtained at operation 44. In one embodiment in which obtaining the numerical analogs comprises generating at least some of the numerical analogs, the generated numerical analogs may be based in part on the local compliance data obtained at operation 44. In one embodiment, operation 46 is performed by a model module that is the same as or similar to model module 20 (shown in FIG. 1 and described above).

At an operation 48, interdependencies between the characteristics described in the numerical analogs are obtained. Obtaining the interdependencies may include analyzing the numerical analogs to determine the interdependencies and/or obtaining previously stored interdependencies. The interdependencies may include interdependencies that are generated, modified, and/or configured by one or more users. In some embodiments, the interdependencies may be quantified by one or more rules. In such embodiment, obtaining the interdependencies may include obtaining the rules that quantify the interdependencies. In one embodiment, operation 48 is performed by a rules module that is the same as or similar to rules module 22 (shown in FIG. 1 and described above).

At an operation 50, probabilities of correspondence are determined and/or assigned to the individual numerical analogs. The probability of correspondence assigned to a given numerical analog expresses a probability that the actual geological architecture of the geologic volume of interest corresponds to the geological architecture described by the given numerical analog. The probability of correspondence for the given numerical analogs is determined by comparing the geological architecture described by the given numerical analog with the local compliance data, and by applying the interdependencies determined at operation 48 to the given numerical analog and/or the local compliance data with respect to the given numerical analog. In one embodiment, operation 50 is performed by a probability module that is the same as or similar to probability module 26 (shown in FIG. 1 and described above).

At an operation 52, a first set of the numerical analogs are accepted for further analysis and/or processing and a second set of numerical analogs are rejected for further analysis or processing. The numerical analogs are divided at operation 52 into the first set and the second set based on the probabilities of correspondence determined at operation 50. In one embodiment, operation 52 is performed by a selection module that is the same as or similar to selection module 28 (shown in FIG. 1 and described above).

Figure 9:
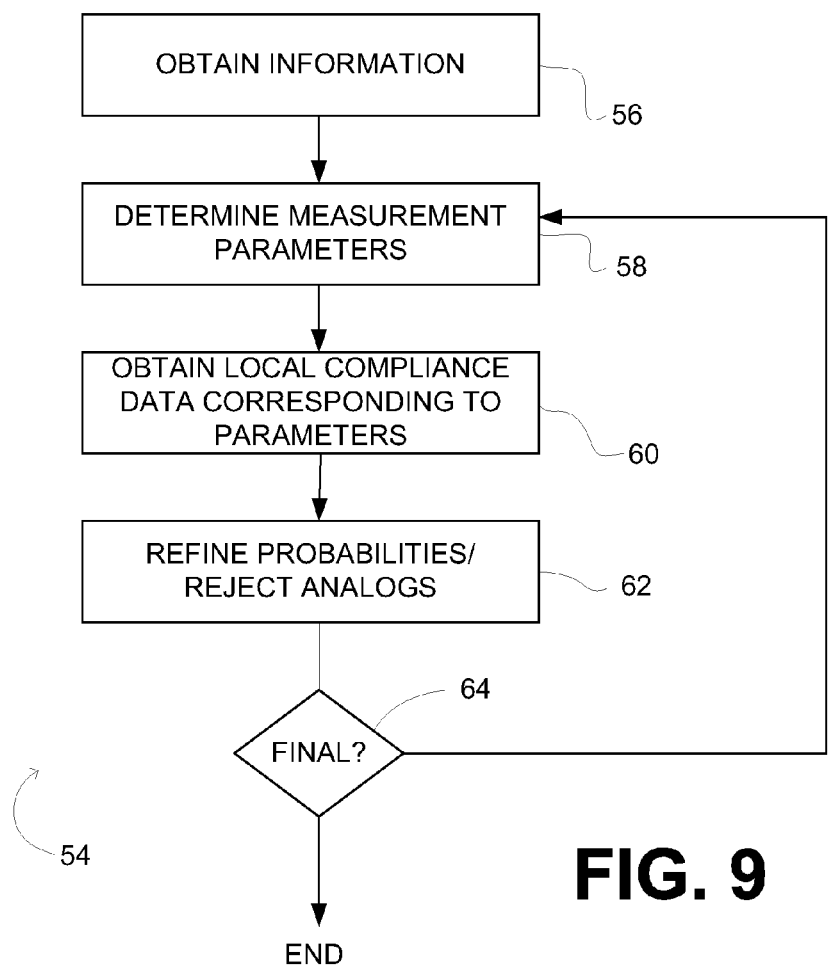
FIG. 9 illustrates a method of estimating geological architecture of a geologic volume of interest, according to one or more embodiments of the invention.

FIG. 9 illustrates a method 54 of estimating geological architecture of a geologic volume of interest. The operations of method 54 presented below are intended to be illustrative. In some embodiments, method 54 may be accomplished with one or more additional operations not described, and/or without one or more of the operations discussed. Additionally, the order in which the operations of method 54 are illustrated in FIG. 9 and described below is not intended to be limiting.

In some embodiments, method 54 may be implemented in a computing system comprising one or more processors (e.g., a digital processor, an analog processor, a digital circuit designed to process information, an analog circuit designed to process information, a state machine, and/or other mechanisms for electronically processing information). The one or more processors may include one or more devices executing some or all of the operations of method 54 in response to instructions stored electronically on an electronic storage medium. The one or more processors may include one or more devices configured through hardware, firmware, and/or software to be specifically designed for execution of one or more of the operations of method 54.

At an operation 56, numerical analogs representing potential geological architectures of the geologic volume of interest, probabilities of correlation for the numerical analogs are obtained, and interdependencies between the characteristics represented in the numerical analogs. In one embodiment, at operation 56 local compliance data for the geologic volume of interest is also obtained. In one embodiment, operation 56 includes method 32 (shown in FIG. 6 and described above). In one embodiment, operation 56 includes method 42 (shown in FIG. 7 and described above). In these embodiments, the numerical analogs obtained at operation 56 are the first set of numerical analogs accepted for additional processing at operation 40 or 52.

At an operation 58, measurement parameters for the acquisition of local compliance data from the geologic volume of interest are determined. The measurement parameters are determined to result in the acquisition of local compliance data that facilitates discrimination between the numerical analogs obtained at operation 56. The determination of the measurement parameters is based on the geological architectures described by the individual numerical analogs, the interdependencies between the characteristics represented by the numerical analogs, and/or the previously obtained local compliance data. In one embodiment, operation 58 is performed by a measurement module that is the same as or similar to measurement module 30 (shown in FIG. 1 and described above).

At an operation 60, local compliance data for the geologic volume of interest acquired during one or more measurements complying with the measurement parameters determined at operation 58 is obtained. This local compliance data is acquired by one or more earth property measurement systems at or near the geologic volume of interest. The local compliance data may be obtained over a network, via removable electronic storage, and/or by other mechanisms for electronically transferring information to the computer system implementing method 54. In one embodiment, operation 60 is performed by a processor that is the same as or similar to processor 18 (shown in FIG. 1 and described above) executing one or more computer modules that result in obtaining the local compliance data for use in additional processing on the processor.

At an operation 62, the probabilities of correlation for the numerical analogs are refined and/or at least some of the numerical analogs are rejected for additional processing based on the local compliance data obtained at operation 60 (and/or the previously obtained interdependencies between the characteristics represented in the numerical analogs). In one embodiment, operation 62 is performed by a probability module and/or a selection module that is the same as or similar to probability module 26 and/or selection module 28 (shown in FIG. 1 and described above), respectively.

At an operation 64, if the refinement of probabilities of correlation and rejection of numerical analogs for additional processing at operation 62 resulted in the selection of a final set of numerical analogs, then method 54 is ended and one or more properties of the geologic volume of interest can be estimated from the final set of probability weighted numerical analogs. If, however, operation 64 has not resulted in a final set of numerical analogs (e.g., the local compliance data did not provide enough clarity to reduce the numerical analogs to the final set), then method 54 returns to operation 58 to enable further reduction of the numerical analogs.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A computer implemented method of estimating geological architecture of a geologic volume of interest with a computing system that includes one or more electronic processors configured to execute one or more computer program modules, the method comprising;

obtaining on one or more electronic storage media accessible to the computing system a plurality of numerical analogs for a geologic volume of interest, wherein a numerical analog for the geologic volume of interest represents a plurality of characteristics of the geologic volume of interest as a function of position within geologic volume of interest;

executing, on the one or more processors of the computing system, one or more computer program modules configured to identify interdependencies between the plurality of characteristics of the geologic volume of interest that are represented within the numerical analogs as a function of position within the geologic volume of interest; and executing, on the one or more processors of the computing system, one or more computer program modules configured to assign probabilities of correspondence between individual ones of the numerical analogs and the geologic volume of interest, wherein the probability of correspondence between a given one of the numerical analogs and the geologic volume of interest is assigned based on the distributions of the plurality of characteristics represented in the given numerical analog as a function of position within the geologic volume of interest and the determined interdependencies between the plurality of characteristics.

2. The method of claim 1, wherein identifying interdependencies between the plurality of characteristics of the geologic volume of interest that are represented within the numerical analogs as a function of position within the geologic volume of interest comprises identifying constraints on the distribution of one or more characteristics that are represented in the numerical analogs that can be implemented in future modeling of the geologic volume of interest or to refine one or more existing models of the geologic volume of interest.

3. The method of claim 1, wherein the plurality of characteristics represented in the numerical analogs as a function of position within the geologic volume of interest comprise one or more of porosity, permeability, facies, facies proportion, architectural element type, geometry, grain size, energy or velocity at time of deposition, deposition rate, distance from source, position relative to axis and/or margin of flow, position relative to base and/or top of flow, flow direction, flow concentration, full grain size distribution, flow volume, external to basin influences eustacy/water depth, sediment supply, or tectonics/compaction parameters.

4. The method of claim 1, wherein identifying interdependencies between the plurality of characteristics of the geologic volume of interest that are represented within the numerical analogs as a function of position within the geologic volume of interest comprises identifying interdependencies between geologic features of the numerical analogs where the geologic features of the numerical analogs are a function of the characteristics represented in the numerical analogs as a function of position within the geologic volume.

5. The method of claim 4, wherein the geologic features of the numerical analogs comprise one or more of channel sinuosity, architectural element sinuosity, avulsion type, avulsion frequency or rate, aggradation rate or frequency, distribution of channel, distribution in individual channels of one or more of the characteristics represented in the numerical analogs, distribution outside of any architectural element of one or more of the characteristics represented in the numerical analogs, compensation index, lacunarity, connectivity/tortuousity, time series analysis on the sequence of any of the features, levee height and width, splay frequency, lateral accretion rate, or retrogradation/progradation rate.

6. The method of claim 1, wherein obtaining on one or more electronic storage media accessible to the computing system a plurality of numerical analogs for a geologic volume of interest comprises executing, on the one or more processors of the computing system, one or more computer program modules configured to generate the plurality of numerical analogs.

7. A computer implemented method of estimating geological architecture of a geologic volume of interest with a computing system that includes one or more electronic processors configured to execute one or more computer program modules, the method comprising;
   obtaining on one or more electronic storage media accessible to the computing system a plurality of numerical analogs for a geologic volume of interest, wherein a numerical analog for the geologic volume of interest represents a plurality of characteristics of the geologic volume of interest as a function of position within geologic volume of interest;
   obtaining on one or more electronic storage media accessible to the computing system interdependencies between the plurality of characteristics of the geologic volume of interest that are represented within the numerical analogs as a function of position within the geologic volume of interest;
   obtaining local compliance data that includes measurements taken at the geologic volume of interest related to one or more of the plurality of characteristics represented in the numerical analogs as a function of position in the geologic volume of interest; and
   executing, on the one or more processors of the computing system, one or more computer program modules configured to determine probabilities of correspondence between individual ones of the numerical analogs and the geologic volume of interest, wherein the probability of correspondence between a given one of the numerical analogs and the geologic volume of interest is determined based on the distributions of the plurality of characteristics represented in the given numerical analog as a function of position within the geologic volume of interest, the local compliance data, and the determined interdependencies between the plurality of characteristics.

8. The method of claim 7, wherein the plurality of characteristics represented in the numerical analogs as a function of position within the geologic volume of interest comprise one or more of porosity, permeability, facies, facies proportion, architectural element type, geometry, grain size, energy or velocity at time of deposition, deposition rate, distance from source, position relative to axis and/or margin of flow, position relative to base and/or top of flow, flow direction, flow concentration, full grain size distribution, flow volume, external to basin influences eustacy/water depth, sediment supply, or tectonics/compaction parameters.

9. The method of claim 7, wherein the interdependencies between the plurality of characteristics of the geologic volume of interest that are represented within the numerical analogs as a function of position within the geologic volume of interest comprise interdependencies between geologic features of the numerical analogs where the geologic features of the numerical analogs are a function of the characteristics represented in the numerical analogs as a function of position within the geologic volume.

10. The method of claim 9, wherein the geologic features of the numerical analogs comprise one or more of channel sinuosity, architectural element sinuosity, avulsion type, avulsion frequency or rate, aggradation rate or frequency, distribution of channel, distribution in individual channels of one or more of the characteristics represented in the numerical analogs, distribution outside of any architectural element of one or more of the characteristics represented in the numerical analogs, compensation index, lacunarity, connectivity/tortuousity, time series analysis on the sequence of any of the features, levee height and width, splay frequency, lateral accretion rate, or retrogradation/progradation rate.

11. The method of claim 7, wherein determining probabilities of correspondence between individual ones of the numerical analogs and the geologic volume of interest comprises accepting a first set of the numerical analogs for further analysis and/or consideration and rejecting a second set of the numerical analogs that are less probable than the first set of numerical analogs.

12. A computer implemented method of estimating geological architecture of a geologic volume of interest with a computing system that includes one or more electronic processors configured to execute one or more computer program modules, the method comprising;
   obtaining on one or more electronic storage media accessible to the computing system a plurality of numerical analogs for a geologic volume of interest, wherein a numerical analog for the geologic volume of interest represents a plurality of characteristics of the geologic volume of interest as a function of position within geologic volume of interest;

obtaining on one or more electronic storage media accessible to the computing system interdependencies between the plurality of characteristics of the geologic volume of interest that are represented within the numerical analogs as a function of position within the geologic volume of interest;

executing, on the one or more processors of the computing system, one or more computer program modules configured to determine one or more measurement parameters for the acquisition of local compliance data from the geologic volume of interest, wherein local compliance data that includes measurements taken at the geologic volume of interest related to one or more of the plurality of characteristics represented in the numerical analogs as a function of position in the geologic volume of interest, and wherein the one or more measurement parameters are based on the numerical analogs and the interdependencies between the plurality of characteristics of the geologic volume of interest that are represented within the numerical analogs and also wherein the acquisition of local compliance data in accordance with the determined one or more measurement parameters enhance determinations of probabilities of correspondence between individual ones of the numerical analogs and the geologic volume of interest based on the distributions of the plurality of characteristics represented in the numerical analogs as a function of position within the geologic volume of interest, the local compliance data acquired according to the one or more measurement parameters, and the determined interdependencies between the plurality of characteristics.

13. The method of claim 12, further comprising:

executing, on the one or more processors of the computing system, one or more computer program modules configured to group the plurality of numerical analogs into a plurality of sets including a first set of numerical analogs and a second set of numerical analogs, wherein the first set of numerical analogs is made up of numerical analogs that more probably correspond to the geographical volume of interest than the numerical analogs in the second set of numerical analogs; and wherein determination of the one or more measurement parameters is based on the numerical analogs in the first set of numerical analogs but is not based on the numerical analogs in the second set of numerical analogs.

14. The method of claim 13, further comprising:

obtaining previously acquired local compliance data that includes measurements previously taken at the geologic volume of interest related to one or more of the plurality of characteristics represented in the numerical analogs as a function of position in the geologic volume of interest; and wherein grouping of the plurality of numerical analogs into the first set of numerical analogs and the second set of numerical analogs is based on the distributions of the plurality of characteristics represented in the numerical analogs as a function of position within the geologic volume of interest, the previously acquired local compliance data, and the obtained interdependencies between the plurality of characteristics.

15. The method of claim 12, wherein the one or more measurement parameters includes one or more parameters of a well to be drilled at or near the geologic volume of interest and/or one or more parameters of an acquisition of seismic data at or near the geologic volume of interest.

16. The method of claim 12, wherein acquisition of local compliance data in accordance with the determined one or more measurement parameters enhance estimation of property distributions from probability weighting of the characteristics represented in the numerical analogs.

* * * * *